US006463745B2

(12) United States Patent
Bleier et al.

(10) Patent No.: US 6,463,745 B2
(45) Date of Patent: Oct. 15, 2002

(54) DEVICE AND PROCESS FOR COOLING GRANULES

(75) Inventors: Harald Bleier, Wiener Neustadt; Andreas Huber, Vienna, both of (AT)

(73) Assignee: Battenfeld GmbH, Meinerzhagen (DE)

( * ) Notice: Subject to any disclaimer, the term of this patent is extended or adjusted under 35 U.S.C. 154(b) by 0 days.

(21) Appl. No.: 09/930,551

(22) Filed: Aug. 15, 2001

(65) Prior Publication Data

US 2002/0074678 A1 Jun. 20, 2002

(30) Foreign Application Priority Data

Sep. 2, 2000 (DE) ........................................ 100 43 238

(51) Int. Cl.[7] ........................ F25D 25/00; B29B 11/06; B29C 35/00; B29C 45/02

(52) U.S. Cl. ........................... 62/62; 425/547; 425/557

(58) Field of Search ........................... 62/62, 331, 378; 425/547, 557

(56) References Cited

U.S. PATENT DOCUMENTS 2,456,124 A * 12/1948 Hoffman ........................ 62/62
3,035,303 A 5/1962 Stanley et al.
3,588,956 A 6/1971 Poux et al.
3,744,262 A * 7/1973 Bose ............................. 62/62
4,043,715 A * 8/1977 Hendry ....................... 425/557
4,047,896 A * 9/1977 Vanderveen ................. 23/314
4,145,176 A * 3/1979 Nelson ........................ 425/547
4,158,540 A * 6/1979 Stillhard ..................... 425/557
4,934,921 A 6/1990 Shieh
5,146,758 A * 9/1992 Herman .......................... 62/62
5,501,266 A * 3/1996 Wang et al. ................ 164/113
5,684,087 A * 11/1997 Wulff et al. .................. 525/63

FOREIGN PATENT DOCUMENTS

DE 198 24 129 C2 7/2000

OTHER PUBLICATIONS

In Grundlagen der Regelungstechnik, E. Pestel, et al. (Braunschweig: Friedr. Vieweg & Sohn), pp. 21–31 (1968).

* cited by examiner

*Primary Examiner*—William C. Doerrler
(74) *Attorney, Agent, or Firm*—Hamilton, Brook, Smith & Reynolds, P.C.

(57) ABSTRACT

A device and method for cooling granules, in particular wax granules, for processing in an injection-moulding machine, which has a cavity for receiving the granules and having an inlet opening and an outlet opening, and at least one further opening is provided for supplying a gaseous medium. In the device of the invention, the outlet opening is arranged directly or indirectly at the feed region of the screw of an injection-moulding machine and the cavity is connected to a cold-gas production device. In the process of the invention, the inlet temperature and the outlet temperature of the gas is determined and by determining the temperature difference, the preset theoretical temperature in the cavity is controlled and/or regulated.

24 Claims, 1 Drawing Sheet

DEVICE AND PROCESS FOR COOLING GRANULES

RELATED APPLICATION

This application claims priority to German Application 100 43 238.7, filed on Sep. 2, 2000, the teachings of which are incorporated herein by reference.

BACKGROUND OF THE INVENTION

Devices for casting mouldings made from wax are known, for example from U.S. Pat. No. 4,934,921. Wax is conveyed from a plastifying unit by means of a piston into an injection unit and supplied to the moulding nest. Plastifying and injecting units, which are provided with means for cooling, are known, for example, from U.S. Pat. No. 3,588,956, since, for example, in PVC processing, precise temperature control is required.

For some manufacturing tasks, it is advantageous to have precise shaped wax mouldings, which serve as a core or casting mould which can be melted out, for example, within the framework of a casting process.

Wax may be processed in principle in an injection-moulding machine. However, it has been shown that in classical use of an injection-moulding machine, problems occur during wax processing. The result is namely then that the wax sticks in the thread region of the plastifying and injecting screw, so that the spirals become more and more clogged and become inefficient to use. The accumulation of wax may also take place disadvantageously even at other points of the injection-moulding machine, for example, in the region in front of the die. An already advantageously designed device is proposed in German Offenlegungsschrift No. 19 824 129. Tests using such devices have shown that the wax starts to melt even in the feed funnel due to the temperature prevailing in the injection cylinder and hence tends to stick.

SUMMARY OF THE INVENTION

Prior cooling of the wax granules has led to the surprising result that the disadvantages described no longer occur.

One aspect of the present invention is therefore to provide a device and a process for cooling granules, which facilitates relatively problem-free processing of the granules, in particular wax granules, in otherwise conventional injection-moulding machines.

In one embodiment, a device is provided which cools the granules, in particular wax granules, before supplying them to the injection-moulding machine, by arranging the outlet opening directly or indirectly at a feed region of the screw of an injection-moulding machine and the cavity is connected to a cold-gas production device.

This ensures that the granules may be cooled to about 4° C. before being supplied to the injection-moulding machine. Sticking, for example, of the grains of wax granules is thus minimized. Any size of granules can be used. The walls of the cavity, in one embodiment, are advantageously insulated to improve the cooling effect.

The air supply, in one embodiment, is arranged in the lower region of the cavity, that is, in the vicinity of the outlet opening, and the air discharge is arranged in the upper region, that is, in the vicinity of the inlet opening. The cooled air is thus forcibly guided through the granules.

By way of further development, the cold-gas production device can be equipped with a heat exchanger. It is advantageous if a water separator is additionally arranged in the pipes and hence in the air circuit. Moisture is removed from the air by this water separator; that is, not only cold, but also dry air is conveyed through the granules, which results in drying of the granules and has a positive effect on the following processing method.

As an alternative, it is also conceivable to modify a commercially available refrigerated cabinet such that the granules are stored therein and may be drawn off by suction and supplied to the machine as required.

The process of the invention for cooling granules is provided wherein the inlet temperature and the outlet temperature of the gas is determined, and by determining the temperature difference, the preset theoretical temperature in the cavity is controlled and/or regulated. The preset theoretical temperature advantageously lies below the room temperature.

By way of further development, water is removed from the gas before supplying it to the cavity by means of a drying device, for example, by a water separator. Drying of the granules is thus achieved at the same time, since the gas may take up moisture when flowing through the cavity filled with granules.

It is particularly economical if the gas discharged from the cavity is supplied back to the cold-gas production device and thus passes through the device in a circuit. Air is used primarily as gaseous medium, but it is also conceivable to use, for example, nitrogen or other gases.

Figure 1:
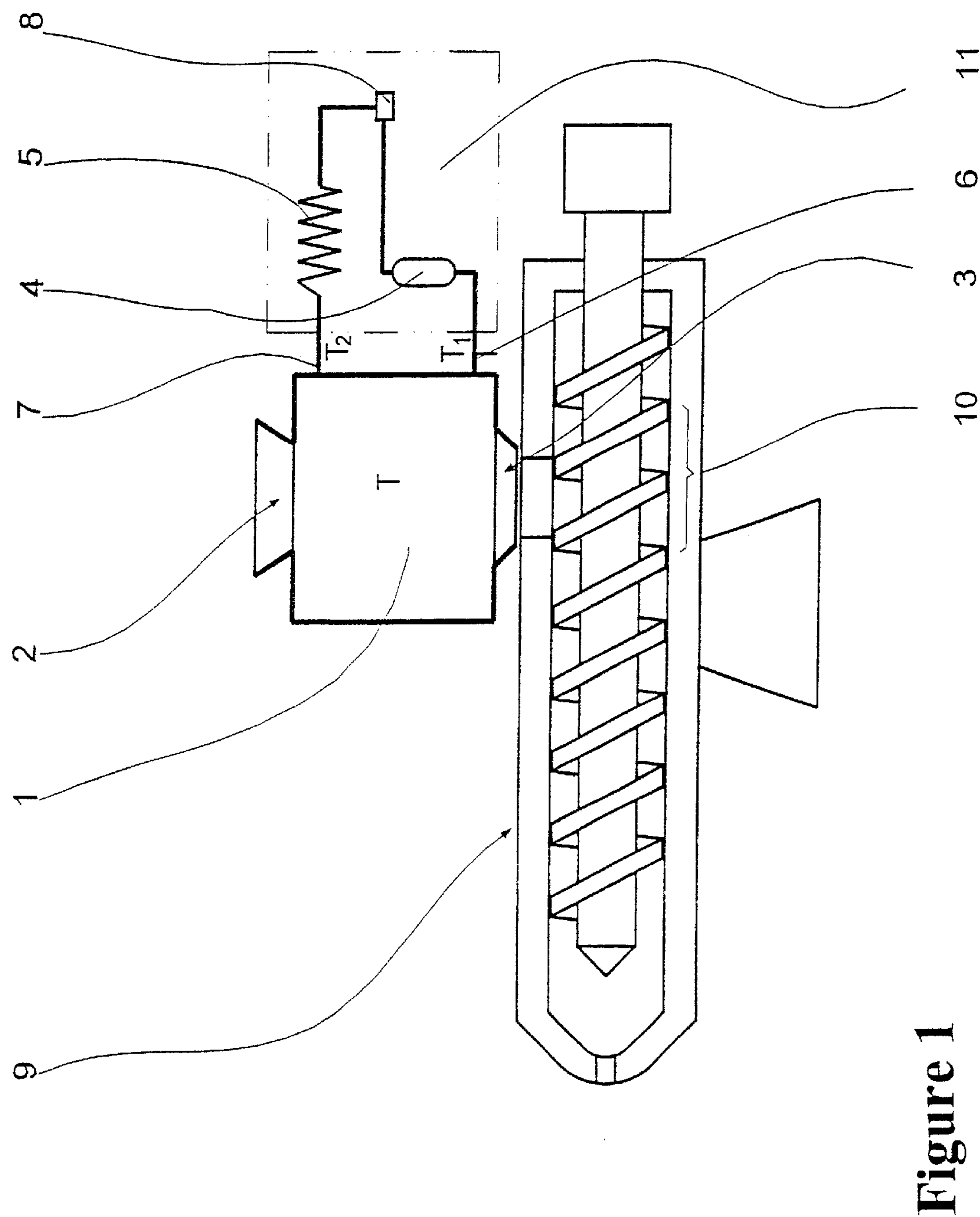
FIG. 1 is a schematic of an injection-moulding machine in accordance with the present invention.

The foregoing and other objects, features and advantages of the invention will be apparent from the following more particular description of preferred embodiments of the invention, as illustrated in the accompanying drawing. The drawing is not necessarily to scale, emphasis instead being placed upon illustrating the principles of the invention.

DETAILED DESCRIPTION OF THE INVENTION

A description of preferred embodiments of the invention follows. FIG. 1 shows schematically an injection-moulding machine 9 having a screw. The outlet opening 3 of a cavity 1 is arranged above the feed region 10 of the screw. Heat for processing less suitable granules is supplied to the cavity 1 via its inlet opening 2. Cold gas flows through the granules. It is supplied to the cavity 1 via the opening 6 and may escape again from the cavity 1 via the opening 7. The two openings 6, 7 are connected to a cold-gas production unit 11 via pipes. The gaseous medium, here air, is cooled via the heat exchanger 5 and dried via the water separator 8. It is supplied from the air or gas store 4 back to the cavity 1 to again flow through the granules.

The openings 6, 7 are provided with temperature-measuring devices in order to measure the inlet temperature $T_1$ and outlet temperature $T_2$ of the air. By determining the temperature difference, the cooling power required may be established and hence a predetermined temperature in the cavity 1 and hence the temperature of the granules may be controlled and/or regulated. It is particularly advantageous if the theoretical temperature lies below the room temperature. The walls of the cavity can be insulated to increase the efficiency.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device for cooling granules for processing in an injection-moulding machine, the device having a cavity for receiving the granules, the cavity having an inlet opening and an outlet opening, and at least one further opening is provided for supplying a gaseous medium, wherein the outlet opening is arranged directly or indirectly at a feed region of the screw of an injection-moulding machine, and the cavity is connected to a cold-gas production device.

2. The device according to claim 1, wherein the walls of the cavity are insulated.

3. The device according to claim 1, wherein the opening for supplying the gaseous medium is arranged in the vicinity of the outlet opening.

4. The device according to claim 1, wherein the temperature in the cavity is controlled and/or regulated at a presetable value below the room temperature.

5. The device according to claim 1, wherein the gaseous medium includes air.

6. The device according to claim 1, wherein the granules include wax granules.

7. The device according to claim 1, wherein the cold-gas production device includes a heat exchanger.

8. The device according to claim 1, wherein the cold-gas production device includes a drying device for removing water from the gaseous medium.

9. A process for cooling granules for processing in an injection-moulding machine, wherein a gaseous medium from a cold-gas production unit is supplied via a first opening to a cavity suitable for receiving granules and is removed via a second opening, the inlet temperature and the outlet temperature of the gas being determined, and by determining the temperature difference, a preset temperature in the cavity is controlled and/or regulated.

10. The process according to claim 9, wherein the preset temperature lies below the room temperature.

11. The process according to claim 9, wherein water is removed from the gaseous medium by means of a drying device before supplying the gaseous medium to the cavity.

12. The process according to claim 9, wherein the gaseous medium discharged from the cavity is supplied to the cold-gas production device.

13. The process according to claim 9, wherein the gaseous medium includes air.

14. The process according to claim 9, wherein the cooling granules include the wax granules.

15. A device for cooling granules for processing in an injection-moulding machine, comprising:

a container for receiving the granules, the container having an inlet opening for receiving granules to be processed, and an outlet opening adjacent to the injection-moulding machine; and a cooling device coupled to the container for cooling the granules therein.

16. The device of claim 15, wherein the temperature in the container is maintained at a predetermined temperature.

17. The device of claim 15, wherein the cooling device employs a gas to cool the granules.

18. The device of claim 17, wherein the cooling device includes a drying device for removing water from the gas.

19. A method for cooling granules for processing in an injection-moulding machine, comprising:

providing a container for receiving the granules, the container having an inlet for receiving granules to be processed, and an outlet adjacent to the injection-moulding machine; and cooling the granules in the container.

20. The method of claim 19, further comprising maintaining the granules at a predetermined temperature.

21. The method of claim 19, further comprising drying the granules in the container.

22. A method comprising cooling wax granules prior to being processed in an injection-moulding machine.

23. A device for cooling granules prior to processing in an injection-moulding machine, comprising:

container means for containing the granules adjacent the injection-moulding machine; and means for cooling the granules in the container means.

24. The device of claim 23, further comprising means for maintaining the granules at a predetermined temperature.

* * * * *